Patented June 25, 1935

2,006,314

UNITED STATES PATENT OFFICE 2,006,314

PROCESS OF PREPARING SUBSTITUTED MALONIC ACIDS

Paul Halbig and Felix Kaufler, Munich, Germany, assignors to Dr. Alexander Wacker Gesellschaft für Elektrochemische Industrie, G. m. b. H., Munich, Germany, a corporation No Drawing. Application May 25, 1933, Serial No. 672,866. In Germany June 8, 1932

14 Claims. (Cl. 260—116)

This invention relates to lower alkyl substituted malonic acids.

We have discovered that substituted malonic acids may be directly obtained from corresponding water insoluble oxy-derivative or aldehyde, that is, a compound containing in place of one or both carboxyl groups of the lower substituted malonic acid, a —CH2OH or —CHO group or groups by oxidation with an acid containing nitric oxide or higher nitrogen oxide, with or without a catalyst. 2-methyl-2-ethyl-propanol-(1)-al-(3), 2-ethyl-2-butyl-propanol-(1)-al-(3), 2-methyl-2-ethyl-propandiol-(1,3), 2,2-diethyl-propanol-(1)-al-(3), 2,2-diethyl-propanol-(1)-acid-(3), etc., are suitable compounds. Nitric acid, nitric acid containing nitric oxide or higher nitrogen oxide, or a mixture of such oxides, nitric acid-sulphuric acid mixtures, sulphuric acid containing nitric oxide or higher nitrogen oxide, or a mixture of such oxides, etc., may be used as the oxidizing agent. Vanadium and molybdenum compounds such as ammonium vanadate, ammonium molybdate, etc., may be used as oxidation catalysts.

The water insoluble corresponding oxy or aldehyde compounds are treated with the acid containing the nitrogen oxide, preferably at between 10° and 50° C., the nitrogen oxide giving up some of its oxygen and being changed to a lower nitrogen oxide, and the derivative is oxidized to a substituted malonic acid. The lower nitrogen oxide formed can be regenerated by treatment with oxygen or an oxygen containing gas, and preferably this regeneration is effected in the reaction apparatus. With regeneration, there is practically no loss of nitrogen oxide, only oxygen being used up in the process.

The substituted malonic acid crystallizes in a very pure condition either with or without concentration of the mother liquor, and after removal and drying of the crystals no purification is necessary.

Example 1

200 grams of 2-methyl-2-ethyl-propanol-(1)-al-(3) are gradually dropped into 400 grams of nitric acid containing nitric oxide (d=1.4) over a period of about two hours at 30 to 40° C. with stirring, the reaction heat being removed by cooling. At the same time, oxygen is gradually introduced in the reaction mass and is briskly absorbed, so that practically no waste gas results. Methyl ethyl malonic acid crystallizes during the dropping process, the mother liquor is stirred for another half hour, the oxygen is blown out and the mother liquor cooled to about 0° C. The crystals are suction-filtered and dried, 212 grams of the same of 121° C. melting point being obtained. Upon concentration of the mother liquor an additional 14 grams crystallizes out. The yield corresponds to about 89% of theory.

Example 2

319 grams of 2,2-diethyl-propanol-(1)-al-(3) are dropped into 600 grams of nitric acid containing nitric oxide (d=1.4) at 15 to 20° C. as in Example 1. 375 grams of diethyl malonic acid of 120° C. melting point are obtained, corresponding to about 94% of theory.

Example 3

26 grams of 2,2-diethyl-propanol-(1)-al-(3) are gradually added to a mixture of 44 grams of 68% nitric acid, 30 grams of 60% sulphuric acid, traces of nitrogen oxide, and 0.1 gram of ammonium vanadate at about 40° C., and oxygen is introduced into the solution. 26 grams of diethyl malonic acid crystallizes from the mother liquor, corresponding to about 80% of theory.

In a similar way substituted malonic acid may be obtained from 2-ethyl-2-butyl-propanol-(1)-al, (3), 2-methyl-2-ethyl-propandiol-(1, 3), 2,2-diethyl-propanol-(1)-acid-(3), etc., with good yield and in a pure state.

We claim as our invention:

1. Process of directly preparing alkyl substituted malonic acids from a corresponding water-insoluble compound containing in place of at least one carboxyl group of the substituted malonic acid at least one of the group consisting of —CH2OH and —CHO, comprising oxidizing said compound with an inorganic acid in the presence of a nitrogen oxide having at least one oxygen atom to one nitrogen atom.

2. Process of directly preparing a malonic acid substituted with lower alkyl substituents from a corresponding water-insoluble compound containing in place of at least one carboxyl group of the substituted malonic acid one of the group consisting of —CH2OH and —CHO, comprising oxidizing said compound with an inorganic acid in the presence of a nitrogen oxide having at least one oxygen atom to one nitrogen atom.

3. Process of directly preparing alkyl substituted malonic acids from a corresponding water-insoluble compound containing in place of at least one carboxyl group of the substituted malonic acid at least one of the group consisting of —CH2OH and —CHO, comprising oxidizing said compound at between 10° and 50° C. with an inorganic acid in the presence of a nitrogen oxide having at least one oxygen atom to one nitrogen atom.

4. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound at between 10° and 50° C. with an inorganic acid in the presence of a nitrogen oxide having at least one oxygen atom to one nitrogen atom and an oxidation catalyst.

5. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound at between 10° and 50° C. with an inorganic acid in the presence of a nitrogen oxide having at least one oxygen atom to one nitrogen atom and oxidizing the lower nitrogen oxide formed in the reaction mixture.

6. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound with nitric acid.

7. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound with nitric acid in the presence of a nitrogen oxide having at least one oxygen atom to one nitrogen atom.

8. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound with a mixture of nitric acid, sulphuric acid and a nitrogen oxide having at least one oxygen atom to one nitrogen atom.

9. Process of preparing methyl ethyl malonic acid comprising treating 2-methyl-2-ethyl-propanol-(1)-al-(3) with nitric acid containing a nitrogen oxide having at least one oxygen atom to one nitrogen atom at between 10 and 50° C.

10. Process of preparing ethyl butyl malonic acid comprising treating 2-ethyl-2-butyl-propanol-(1)-al-(3) with nitric acid containing a nitrogen oxide having at least one oxygen atom to one nitrogen atom at between 10 and 50° C.

11. Process of preparing diethyl malonic acid comprising treating 2,2-diethyl-propanol-(1)-al-(3) with a mixture of nitric acid, sulphuric acid and nitrogen oxide having at least one oxygen atom to one nitrogen atom in the presence of ammonium vanadate at between 10 and 50° C.

12. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound at between 10° and 50° C. with an inorganic acid in the presence of a nitrogen oxide having at least one oxygen atom to one nitrogen atom, oxidizing the formed lower nitrogen oxide and utilizing the oxidized nitrogen oxide for the production of alkyl-substituted malonic acid.

13. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound at between 10° and 50° C. with an inorganic acid in the presence of a nitrogen oxide having at least one oxygen atom to one nitrogen atom and introducing oxygen into the reaction mixture to oxidize the lower nitrogen oxide formed therein.

14. Process of directly preparing alkyl substituted malonic acids from a corresponding water-insoluble compound containing in place of at least one carboxyl group of the substituted malonic acid at least one of the group consisting of —CH$_2$OH and —CHO, comprising oxidizing said compound at between 10° and 50° C. with an inorganic acid in the presence of a nitrogen oxide having at least one oxygen atom to one nitrogen atom and introducing oxygen-containing gases into the reaction mixture to oxidize the lower nitrogen oxide formed therein.

PAUL HALBIG.
FELIX KAUFLER.